US009844114B2

(12) United States Patent
Chowdhury et al.

(10) Patent No.: US 9,844,114 B2
(45) Date of Patent: Dec. 12, 2017

(54) COLOR MIXING FOR SOLID STATE LIGHTING USING DIRECT AC DRIVES

(71) Applicant: ABL IP Holding LLC, Decatur, GA (US)

(72) Inventors: Towfiq Chowdhury, Lake Forest, IL (US); Michael Z. Gielniewski, Bartlett, IL (US); Feng Chen, Hoffman Estates, IL (US); Alejandro Lopez, Lake Zurich, IL (US)

(73) Assignee: ALB IP HOLDING LLC, Atlanta, GA (US)

( * ) Notice: Subject to any disclaimer, the term of this patent is extended or adjusted under 35 U.S.C. 154(b) by 0 days.

(21) Appl. No.: 15/373,580

(22) Filed: Dec. 9, 2016

(65) Prior Publication Data

US 2017/0171933 A1 Jun. 15, 2017

Related U.S. Application Data

(60) Provisional application No. 62/264,903, filed on Dec. 9, 2015.

(51) Int. Cl.
*H05B 37/02* (2006.01)
*H05B 33/08* (2006.01)

(52) U.S. Cl.
CPC ....... *H05B 33/0857* (2013.01); *H05B 33/083* (2013.01); *H05B 33/0809* (2013.01); *H05B 33/0845* (2013.01)

(58) Field of Classification Search
CPC .............. H05B 33/083; H05B 33/0815; H05B 33/0833; H05B 33/0845; H05B 33/0857; H05B 33/0809; H01L 2924/00

(Continued)

(56) References Cited

U.S. PATENT DOCUMENTS 6,168,299 B1 1/2001 Yan
7,119,500 B2 10/2006 Young
(Continued)

FOREIGN PATENT DOCUMENTS

CA 2767985 1/2011
KR 20100009895 U 10/2010

OTHER PUBLICATIONS

Sun, Ph.D, D, "Challenges and opportunities for high power white LED development", Feb. 1, 2012, (13 pages).
(Continued)

*Primary Examiner* — Don Le
(74) *Attorney, Agent, or Firm* — Kilpatrick Townsend & Stockton, LLP (57) ABSTRACT

Techniques are described to allow a low-cost light fixture to produce light with a relatively high color rendering index (CRI) across a range of color temperatures. A rectified AC voltage may be provided to multiple groups of light-emitting diodes (LEDs) having characteristics related to a range of color temperatures and a target CRI level. The multiple groups of LEDs may be controlled based on a received control signal, such that the combined groups of LEDs produce combined light having a produced color temperature within the range of color temperatures, and having a produced CRI level that is approximately the target CRI level. In some implementations, the received control signal is modified by a modification circuit, and the multiple groups of LEDs may be controlled based on the modified control signal.

18 Claims, 9 Drawing Sheets

(58) Field of Classification Search
USPC .................................................. 315/291, 201
See application file for complete search history.

(56) References Cited

U.S. PATENT DOCUMENTS

| | | | |
|---|---|---|---|
| 7,119,501 B2 | 10/2006 | Young | |
| 7,288,902 B1 | 10/2007 | Melanson | |
| 7,649,322 B2 | 1/2010 | Neuman et al. | |
| 7,764,028 B2 | 7/2010 | Mariyama et al. | |
| 7,902,560 B2 | 3/2011 | Bierhuizen et al. | |
| 7,902,761 B2 | 3/2011 | Ang et al. | |
| 7,959,332 B2 | 6/2011 | Tickner et al. | |
| 7,982,409 B2 | 7/2011 | Hasnain et al. | |
| 8,008,850 B2 | 8/2011 | Su et al. | |
| 8,018,172 B2 | 9/2011 | Leshniak | |
| 8,022,634 B2 | 9/2011 | Greenfeld | |
| 8,096,686 B2 | 1/2012 | Wilcox | |
| 8,118,441 B2 | 2/2012 | Hessling | |
| 8,203,260 B2 | 6/2012 | Li et al. | |
| 8,227,996 B2 | 7/2012 | Leshniak | |
| 8,278,832 B2 | 10/2012 | Hung et al. | |
| 8,324,815 B2 | 12/2012 | Maxik et al. | |
| 8,324,823 B2 | 12/2012 | Choi et al. | |
| 8,324,840 B2 | 12/2012 | Shteynberg et al. | |
| 8,334,658 B2 | 12/2012 | Balakrishnan | |
| 8,358,089 B2 | 1/2013 | Hsia et al. | |
| 8,436,549 B2 | 5/2013 | Hasnain | |
| 8,441,202 B2 | 5/2013 | Wilson et al. | |
| 8,441,205 B2 | 5/2013 | Hsieh et al. | |
| 8,441,213 B2 | 5/2013 | Huynh | |
| 8,471,481 B2 | 6/2013 | Shin et al. | |
| 8,476,829 B2 | 7/2013 | Maxik et al. | |
| 8,491,159 B2 | 7/2013 | Recker et al. | |
| 8,598,804 B2 | 12/2013 | Foxall et al. | |
| 8,629,629 B2 | 1/2014 | Hariharan | |
| 8,633,650 B2 | 1/2014 | Sauerlaender | |
| 8,653,752 B2 | 2/2014 | Sakuragi et al. | |
| 8,686,651 B2 | 4/2014 | Lynch et al. | |
| 8,698,416 B2 | 4/2014 | Pan | |
| 8,702,271 B2 | 4/2014 | Rains, Jr. et al. | |
| 8,704,460 B2 | 4/2014 | Hariharan | |
| 8,710,754 B2 | 4/2014 | Baddela et al. | |
| 8,716,946 B2 | 5/2014 | Lee et al. | |
| 8,736,183 B2 | 5/2014 | Chao | |
| 8,760,262 B2 | 6/2014 | Veskovic | |
| 8,766,555 B2 | 7/2014 | Tu et al. | |
| 8,773,337 B2 | 7/2014 | Li et al. | |
| 8,779,675 B2 | 7/2014 | Mikani et al. | |
| 8,783,887 B2 | 7/2014 | Caruso et al. | |
| 8,783,901 B2 | 7/2014 | Zoorob et al. | |
| 8,810,140 B2 | 8/2014 | Huynh | |
| 8,823,289 B2 | 9/2014 | Linz et al. | |
| 8,847,477 B2 | 9/2014 | Kawashima et al. | |
| 8,872,438 B2 | 10/2014 | Zhou et al. | |
| 8,890,419 B2 | 11/2014 | Stack | |
| 8,901,835 B2 | 12/2014 | Kang et al. | |
| 8,928,249 B2 | 1/2015 | Raj et al. | |
| 9,000,678 B2 | 4/2015 | Huynh | |
| 9,055,650 B2 | 6/2015 | Steedly | |
| 9,125,270 B2 | 9/2015 | Liao et al. | |
| 9,131,571 B2 | 9/2015 | Zhang et al. | |
| 9,143,051 B2 | 9/2015 | Newman, Jr. | |
| 9,144,127 B1 | 9/2015 | Yu et al. | |
| 9,144,128 B2 | 9/2015 | Shin et al. | |
| 9,161,412 B2 | 10/2015 | Lou et al. | |
| 9,247,597 B2 | 1/2016 | Miskin et al. | |
| 9,301,353 B2 | 3/2016 | Park et al. | |
| 9,301,355 B2 | 3/2016 | Zhao | |
| 9,307,604 B2 | 4/2016 | Sun et al. | |
| 9,326,343 B2 | 4/2016 | Yan et al. | |
| 9,345,094 B2 | 5/2016 | Lee et al. | |
| 9,414,452 B1 | 8/2016 | Cheng et al. | |
| 9,414,457 B2 | 8/2016 | Fukuda et al. | |
| 9,451,662 B1 | 9/2016 | Chung et al. | |
| 9,456,478 B2 | 9/2016 | Rodriguez et al. | |
| 9,468,062 B2 | 10/2016 | Rybicki et al. | |
| 9,472,593 B2 | 10/2016 | Hasnain et al. | |
| 9,480,116 B2 | 10/2016 | Vissenberg et al. | |
| 9,491,821 B2 | 11/2016 | Shackle | |
| 9,562,671 B2 | 2/2017 | Davis | |
| 9,596,730 B1 | 3/2017 | Ciccarelli et al. | |
| 9,644,828 B1 | 5/2017 | May | |
| 2008/0094000 A1 | 4/2008 | Yamamoto et al. | |
| 2008/0258643 A1 | 10/2008 | Cheng et al. | |
| 2009/0026913 A1 | 1/2009 | Mrakovich | |
| 2009/0195186 A1 | 8/2009 | Guest et al. | |
| 2010/0061108 A1 | 3/2010 | Zhang et al. | |
| 2010/0084992 A1 | 4/2010 | Valois et al. | |
| 2010/0110699 A1 | 5/2010 | Chou | |
| 2010/0148672 A1 | 6/2010 | Hopper | |
| 2010/0225241 A1 | 9/2010 | Maehara et al. | |
| 2010/0244713 A1 | 9/2010 | Lee et al. | |
| 2010/0295460 A1 | 11/2010 | Lin et al. | |
| 2010/0308739 A1 | 12/2010 | Shteynberg et al. | |
| 2010/0308749 A1 | 12/2010 | Liu | |
| 2011/0050125 A1 | 3/2011 | Medendorp, Jr. et al. | |
| 2011/0074292 A1 | 3/2011 | Maehara | |
| 2011/0075414 A1 | 3/2011 | Van De Ven et al. | |
| 2011/0075422 A1 | 3/2011 | Van De Ven et al. | |
| 2011/0101883 A1 | 5/2011 | Grajcar | |
| 2011/0115391 A1 | 5/2011 | Chao et al. | |
| 2011/0170289 A1 | 7/2011 | Allen et al. | |
| 2011/0182065 A1 | 7/2011 | Negley et al. | |
| 2011/0193467 A1 | 8/2011 | Grajcar | |
| 2011/0199753 A1 | 8/2011 | Ramer et al. | |
| 2011/0227489 A1 | 9/2011 | Huynh | |
| 2011/0241551 A1 | 10/2011 | McRae | |
| 2011/0273102 A1* | 11/2011 | van de Ven | H05B 33/0809 315/193 |
| 2011/0316440 A1 | 12/2011 | Leshniak | |
| 2012/0020092 A1 | 1/2012 | Bailey | |
| 2012/0038291 A1 | 2/2012 | Hasnain | |
| 2012/0056556 A1 | 3/2012 | Laski et al. | |
| 2012/0119658 A1 | 5/2012 | McDaniel | |
| 2012/0229030 A1* | 9/2012 | Moskowitz | H05B 33/0809 315/122 |
| 2012/0280635 A1 | 11/2012 | Lu et al. | |
| 2013/0002167 A1* | 1/2013 | Van de Ven | H05B 33/0815 315/297 |
| 2013/0113394 A1 | 5/2013 | Ido et al. | |
| 2013/0119882 A1 | 5/2013 | Mao et al. | |
| 2013/0147387 A1 | 6/2013 | Murdock | |
| 2013/0307423 A1 | 11/2013 | Lee | |
| 2014/0232288 A1* | 8/2014 | Brandes | H05B 33/0803 315/250 |
| 2014/0265882 A1 | 9/2014 | Laski et al. | |
| 2014/0300283 A1 | 10/2014 | Lee et al. | |
| 2014/0300284 A1 | 10/2014 | Lee et al. | |
| 2014/0312777 A1 | 10/2014 | Shearer et al. | |
| 2014/0361696 A1* | 12/2014 | Siessegger | H05B 33/0803 315/186 |
| 2015/0002045 A1 | 1/2015 | Hwang et al. | |
| 2015/0036316 A1 | 2/2015 | Lin et al. | |
| 2015/0084534 A1 | 3/2015 | Fukuda et al. | |
| 2015/0091472 A1 | 4/2015 | Kadotani et al. | |
| 2015/0115823 A1 | 4/2015 | Serra et al. | |
| 2015/0173151 A1 | 6/2015 | Ter Weeme et al. | |
| 2015/0245437 A1* | 8/2015 | Cho | H05B 33/083 315/186 |
| 2015/0264764 A1 | 9/2015 | Choi et al. | |
| 2015/0271884 A1 | 9/2015 | Kim et al. | |
| 2015/0282266 A1 | 10/2015 | Hsing Chen et al. | |
| 2015/0351190 A1* | 12/2015 | Walters | H05B 33/0815 315/186 |
| 2015/0351193 A1 | 12/2015 | Chao et al. | |
| 2016/0174305 A1 | 6/2016 | Kim et al. | |
| 2016/0381750 A1* | 12/2016 | Bong | H05B 33/0845 315/201 |
| 2017/0064785 A1* | 3/2017 | Kim | H05B 33/0845 |

OTHER PUBLICATIONS

U.S. Appl. No. 14/926,107, filed Oct. 29, 2015, (22 pages).
U.S. Appl. No. 15/158,078, filed May 18, 2016, (30 pages).

(56) References Cited

OTHER PUBLICATIONS

U.S. Appl. No. 15/158,100, filed May 18, 2016, (32 pages).
Notice of Allowance for U.S. Appl. No. 15/158,100, dated Nov. 21, 2016 (11 pages).
Notice of Allowance for U.S. Appl. No. 15/158,078, dated Aug. 11, 2017, 10 pages.
Notice of Allowance for U.S. Application No. CA 2,964,005, dated Jul. 10, 2017, 1 page.
"Extended European Search Report for European Application No. EP 13164944", filed Jul. 24, 2015, 7.
"Juno 6 IC LED Retrofit Warmdim (TM) Downlight Trim", Oct. 2012, 2.
"Office Action for Canadian Application No. CA 2809853", filed Oct. 2, 2014, 2.
"Office Action for Canadian Application No. CA 2809853", filed Oct. 5, 2015, 4.
Notice of Allowance for U.S. Appl. No. 15/158,078, dated Mar. 3, 2017, 10 pages.
Notice of Allowance for Canadian Application No. CA 2,960,262, dated May 24, 2017, 1 page.

\* cited by examiner

COLOR MIXING FOR SOLID STATE LIGHTING USING DIRECT AC DRIVES

RELATED APPLICATIONS

The present application claims priority to U.S. provisional application No. 62/264,903 for "Color-mixing for solid state lighting using direct AC drives" filed Dec. 9, 2015, which is incorporated by reference herein in its entirety.

FIELD OF THE INVENTION

This invention and the disclosed implementations relate to the field of color-tunable lighting fixtures, and specifically to controlling groups of light-emitting diodes (LEDs) to produce a relatively high color rendering index.

BACKGROUND

Perception of color is based in part on the color of available illumination sources. For example, when a person with typical color vision looks at a blue object illuminated by sunlight, the person is able to perceive the blue color of the object. This perception of the blue color is partially due to the object's reflection of the sunlight in the blue region of the visual spectrum. However, if the person views the same blue object illuminated by a red light source, such as an artificial red lamp, no light in the blue region of the visual spectrum is available to be reflected. Thus, the red light does not reveal the object's blue color, and the person perceives the blue object as dull and colorless. A color rendering index (CRI) is used to measure the ability of a light source to reveal the true colors of objects illuminated by that light source, where a higher CRI indicates a better ability to reveal true colors as compared to a lower CRI. For example, a CRI level of 100 (e.g., 100%) may indicate an excellent ability to reveal true colors of an object, while a CRI level of 1 (e.g., 1%) may indicate a poor ability to reveal true colors of an object. It may be advantageous for a light fixture to have a relatively high CRI, so that a person using the light fixture is able to perceive relatively accurate colors.

Lighting fixtures may produce different colors and/or color temperatures by combining light produced by multiple sources. For example, a light fixture that is designed for warm dimming may produce light across a range of light intensities and color temperatures (e.g., about 1800 K at lower intensities to about 5000 K at higher intensities) based on a user's control of the light fixture (e.g., a dimmer switch). The light fixture may provide color control by driving multiple groups of LEDs having different color temperatures. However, if the different groups of LEDs also have different CRIs, the light fixture may provide different color perception at different color temperatures. This may cause poor visibility of objects that are illuminated by the light fixture.

One technique for preventing different color perception at different color temperatures is to select all groups of LEDs to have similar CRIs. However, LED groups having a relatively high CRI may be more expensive than LED groups having a relatively low CRI, and selecting all LED groups with a relatively high CRI may result in a light fixture that is more expensive. In addition, selecting all LED groups with a relatively low CRI may result in a fixture that does not provide accurate color perception. Thus, it is desirable to develop techniques to provide a relatively low-cost light fixture with relatively high CRI across a range of color temperatures.

SUMMARY

The described invention provides a method of and circuitry for controlling groups of LEDs to produce light having a relatively high CRI across a range of color temperatures. The produced light may have a color temperature and a CRI that are based on a combination of the respective color temperatures and CRIs of the LED groups that are powered on. The produced light may be adjusted across a range of color temperatures (e.g., from about 1800 K to about 5000 K). The produced light may have a relatively high CRI (e.g., with a value of about 90). The groups of LEDs may also be controlled to produce light across a range of intensities, such as from a low intensity to a higher intensity (e.g., from about 0% to about 100%).

In some implementations, each group of LED may be capable of producing light having a color temperature and a CRI based on characteristics of the particular group. For example, one LED group may be capable of producing light having a relatively warm color temperature and a relatively high CRI. A second LED group may be capable of producing light having a relatively warm color temperature and a relatively low CRI. A third LED group may be capable of producing light having a relatively cool color temperature and a relatively high CRI. A fourth LED group may be capable of producing light having a relatively cool color temperature and a relatively low CRI. Other LED groups capable of producing light with other combinations of characteristics will be apparent to one skilled in the art.

The LED groups may be controlled to produce light, such as by a microcontroller or by a discrete circuit implementation suitable to control the LEDs. The microcontroller may receive a control signal, such as a control signal received from a dimming switch. The control signal may have a range (e.g., between 0% and 100%), and an adjustable level (e.g., adjusted to a level of 50%). The microcontroller may control the LED groups based on the received control signal. For example, the microcontroller could power particular LED groups on or off based on the level of the control signal. In some implementations, the control signal could be an analog voltage signal provided by an adjustable switch, or a digital control signal provided by a digital source. In some implementations, the control signal may be modified prior to being provided to the microcontroller. The control signal may have a voltage range between a minimum and maximum value (e.g., from 0 to 10 volts).

In some implementations, the multiple LED groups produce light that is based on a combination of the respective light produced by the particular groups that are powered on. For example, if a first LED group and a second LED group are powered on, the two LED groups may produce a combined light that has a color temperature and a CRI that are based on the respective color temperatures and CRIs of the light produced by the first group and the light produced by the second group. If the first LED group produces light having a relatively warm color temperature and a relatively high CRI, and the second LED group produces light having a relatively cool color temperature and a relatively low CRI, the combined light produced by the two groups may have the color temperature that is in between the relatively warm and relatively cool color temperatures, and a CRI that is in between the relatively high and relatively low CRI values.

In certain implementations, the LED groups each have a CRI that is either above, equal, or below a target CRI level. In some cases, the target CRI level is a level at which a person may be able to perceive relatively accurate colors, and the multiple LED groups may produce a combined light having a CRI that is approximately the target CRI level. For example, if a first LED group has a CRI equal to or above the target level, and a second LED group has a CRI below the target level, the combined light produced by the two groups may have a CRI similar to the target level.

These illustrative implementations are mentioned not to limit or define the disclosure, but to provide examples to aid understanding thereof. Comparable results may be achieved using other configurations. Such alternate implementations will be apparent to one skilled in the art. Additional implementations are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

The described invention provides a method of and circuitry for controlling groups of LEDs to produce light having a relatively high CRI across a range of color temperatures. The produced light may have a color temperature and a CRI that are based on a combination of the respective color temperatures and CRIs of the LED groups that are powered on. The produced light may be adjusted across a range of color temperatures (e.g., from about 1800 K to about 5000 K). The produced light may have a relatively high CRI (e.g., with a value of about 90). The groups of LEDs may also be controlled to produce light across a range of intensities, such as from a low intensity to a higher intensity (e.g., from about 0% to about 100%).

Figure 1:
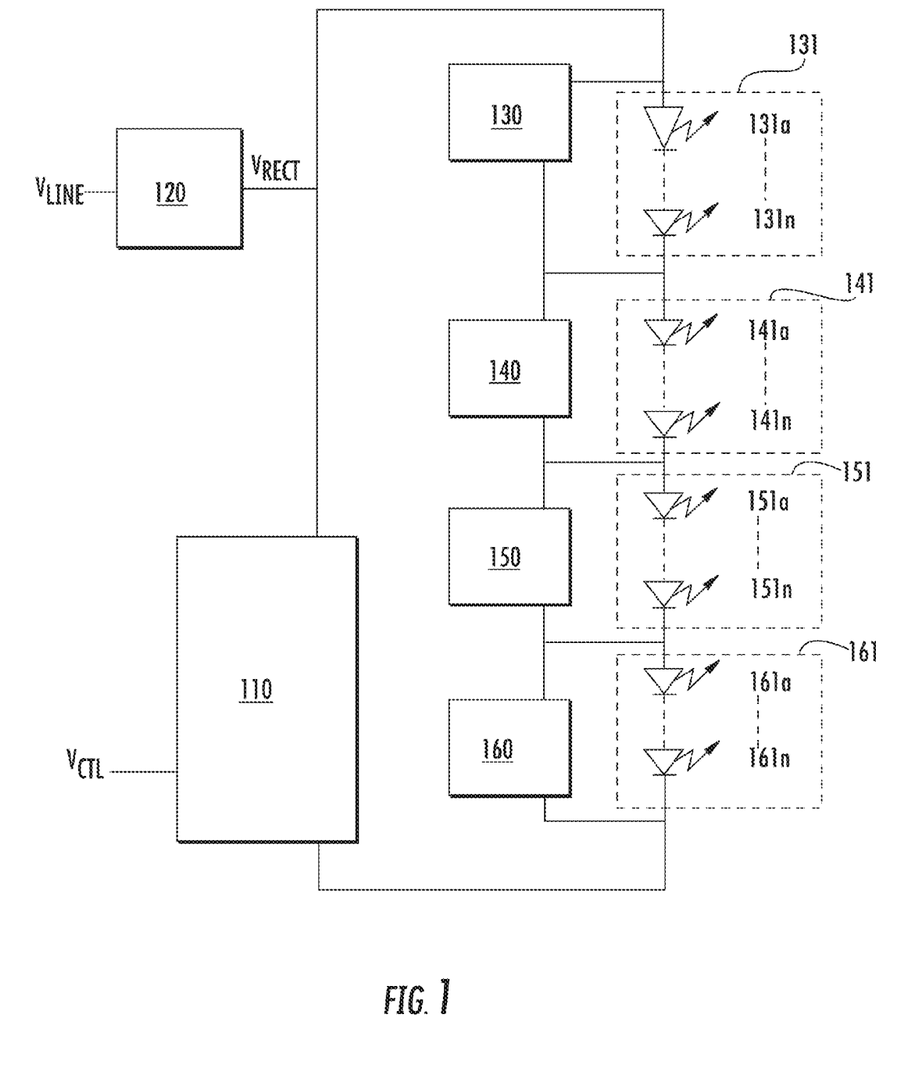
FIG. 1 is a block diagram depicting an example implementation of a circuit capable of producing light having a relatively high CRI.

The following examples are provided to introduce certain details of the disclosed implementations. Referring now to the drawings, FIG. 1 depicts a diagram of an exemplary implementation of a fixture capable of producing light having a relatively high CRI. A microcontroller 110 receives a rectified voltage from a power source capable of providing a rectified signal, such as rectifier 120. The rectifier 120 receives line voltage $V_{line}$. The line voltage may be 117 volts, 120 volts, 240 volts, 277 volts, or any suitable voltage. The rectifier 120 may rectify the received line voltage to produce rectified voltage $V_{rect}$, and may provide the rectified voltage to the microcontroller 110. The microcontroller 110 may provide a regulated current having a relatively stable level (e.g., direct current) based on the rectified voltage. In some implementations, the rectifier 120 may provide the rectified voltage $V_{rect}$ to one or more groups of LEDs, such as LED group 131, or the rectifier 120 may provide the rectified voltage to an LED driver, such as LED driver 130. Although the power source is depicted as a rectifier, other implementations are possible. Although the exemplary fixture includes a microcontroller, other implementations are possible, such discrete circuit components capable of controlling LEDs and/or regulating current.

The microcontroller 110 may receive a control signal, such as $V_{ctl}$. The control signal may be an analog signal, such as a forward phase-cut or reverse phase-cut signal, or a 0 to 10 volt signal. In some cases, the control signal is modified by one or more circuit components before being received by the microcontroller 110. For example, a 0-10 V digital signal may be modified to a 0-3 V signal by a modification circuit (not depicted in FIG. 1), and the modified signal may be received by the microcontroller 110.

The microcontroller 110 may control groups of LEDs based on the control signal. For example, microcontroller 110 may control LED groups 131, 141, 151, and 161 based on the received control signal. In some cases, the microcontroller 110 may control the LED groups via respective LED drivers, such as LED drivers 130, 140, 150, or 160, for respective LED groups 131, 141, 151, and 161. The microcontroller 110 may produce a current having a relatively stable level as described above, where a level of the current is related to a level of the control signal. The microcontroller 110 may provide the current to the LED groups and/or respective LED drivers, and the LED groups may be powered on or off based on the received current. In some cases, a subset of LEDs within a group receive current, such that not all of the LEDs in the group are powered on. At a lower current level, a particular LED driver may shunt some or all of the received current away from a respective LED group, such that the group is powered off, or that fewer LEDs within the group are powered on. At a higher current level, the particular LED driver may shunt some or none of the received current, such that the respective LED group is powered on, or more LEDs within the group are powered on. In some implementations, the microcontroller is configured to provide current to or shunt current away from a respective LED group, or a subset of LEDs within the group.

For example, at a first current level, based on a control signal level between approximately 0% and 100%, LED group 131 may be powered on and produce light. At a second current level, based on a control signal level between approximately 25% and 100%, LED group 141 may be powered on and produce light. At a third current level, based on a control signal level between approximately 50% and 100%, LED group 151 may be powered on and produce light. At a fourth current level, based on a control signal level between approximately 75% and 100%, LED group 161 may be powered on and produce light. Within a group of LEDs, various individual LEDs may be powered on at different levels of the control signal. For example, to produce an effect of dimming, a particular group of LEDs may have fewer LEDs powered on at lower levels of the control signal and more LEDs powered on at higher levels of the control signal. To produce an effect of warm dimming, at lower levels of the control signal a group of LEDs may have more LEDs with warmer color temperatures powered on than with cooler color temperatures, and at higher levels of the control signal the group may have more LEDs with cooler color temperatures powered on than with warmer color temperatures.

Each LED group may produce light based on characteristics of the LEDs included in the group. For example, the LED group 131 may produce light based on the characteristics of the included LEDs 131*a* through 131*n*. LED group 141 may produce light based on the characteristics of the included LEDs 141*a* through 141*n*. LED group 151 may produce light based on the characteristics of the included LEDs 151*a* through 151*n*. LED group 161 may produce light based on the characteristics of the included LEDs 161*a* through 161*n*. The light produced by each group may be a blend of light based on the characteristics of the individual LEDs that are powered on within the group.

Figure 2A:
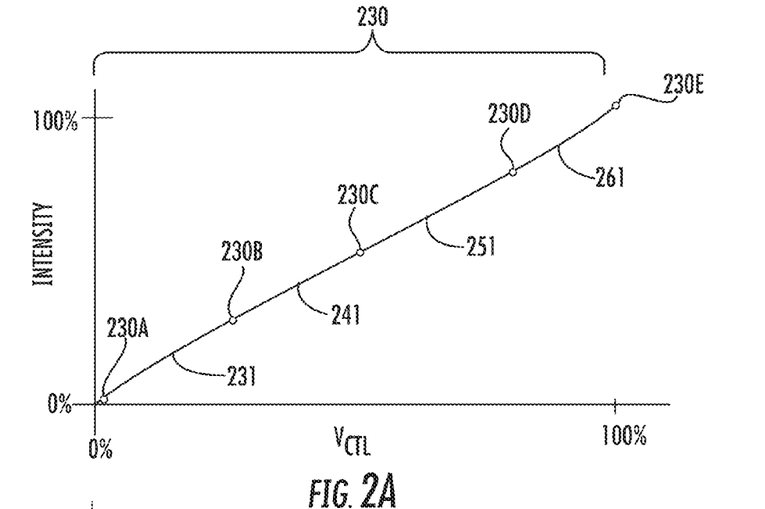
FIGS. 2A through 2C (collectively referred to as FIG. 2) are diagrams depicting exemplary intensities for various groups of LEDs, based on a level of a control signal.
Figure 2B:
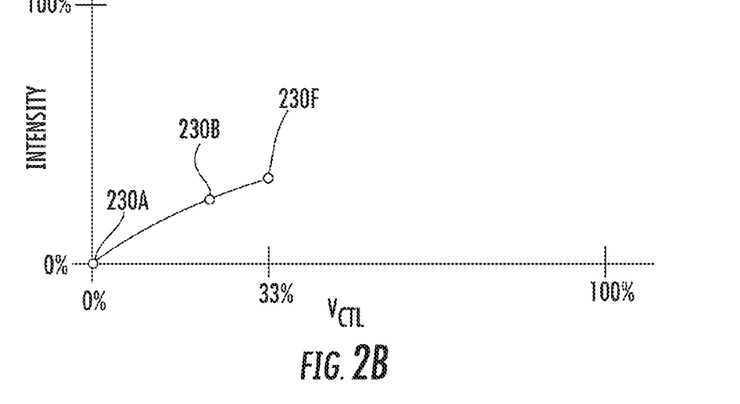
Figure 2C:
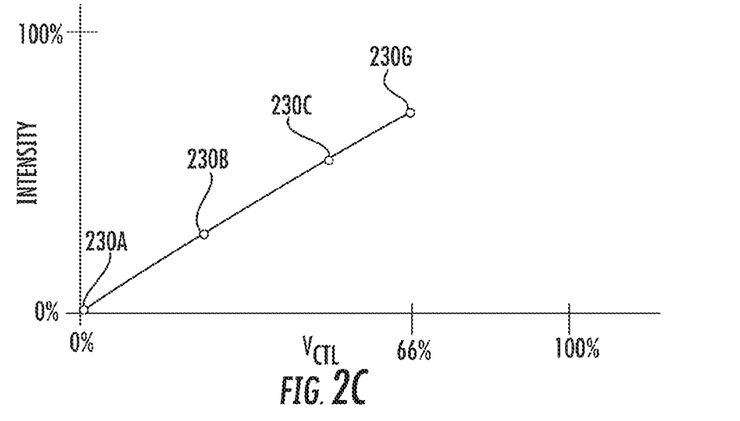

As depicted in FIGS. 2A through 2C, each LED group may produce light at a particular level or range of levels of the received control signal, such as $V_{ctl}$. The produced light may have a range of characteristics relative to the levels of the control signal, such as a range of intensities or a range of color temperatures. For example, at lower levels of the received control signal, an LED group may have fewer LEDs powered on and may produce light at a lower intensity. FIG. 2A depicts an example range of intensities 230, based on a range of control signal levels between 0% and 100%. In this example, a first LED group, such as LED group 131, may produce light over a range 231. The range 231 may have a lower intensity at a point 230A and a higher intensity at a point 230B. A second LED group, such as LED group 141, may produce light over a range 241. The range 241 may have a lower intensity at point 230B and a higher intensity at a point 230C. A third LED group, such as LED group 151, may produce light over a range 251. The range 251 may have a lower intensity at point 230C and a higher intensity at a point 230D A fourth LED group, such as LED group 161, may produce light over a range 261. The range 261 may have a lower intensity at point 230D and a higher intensity at a point 230E. A light fixture that includes the described LED groups may produce a combined light based on the combined intensities of the groups. Although not depicted, the characteristics of the LED groups may have overlapping ranges, such as to provide a smooth transition between groups within a light fixture, or to provide light from multiple LED groups at higher intensities. The intensity ranges are depicted as having a linear response to the control signal levels, but other implementations are possible.

Within a relevant range of the control signal, an LED group may produce light based on intermediate levels of the control signal. FIG. 2B depicts an example wherein the control signal level is at 33%. In this example, the first LED group may produce light having a higher intensity at the point 230B, and the second LED group may produce light having an intermediate intensity within the range 241, at a point 230F. At the control signal level of 33%, the combined light may have an intensity based on a combination of the intensities at points 230B and 230F. FIG. 2C depicts an example wherein the control signal level is at 66%. In this example, the first LED group may produce light having an intensity at the point 230B, the second LED group may produce light having an intensity at the point 230C, and the third LED group may produce light having an intensity at an intermediate point 230G. At the control signal level of 66%, the combined light may have an intensity based on a combination of the intensities at points 230B, 230C, and 230G. Other characteristics of the LED groups, such as color temperature, may also be controlled by adjusting the levels of the control signal.

Figure 3A:
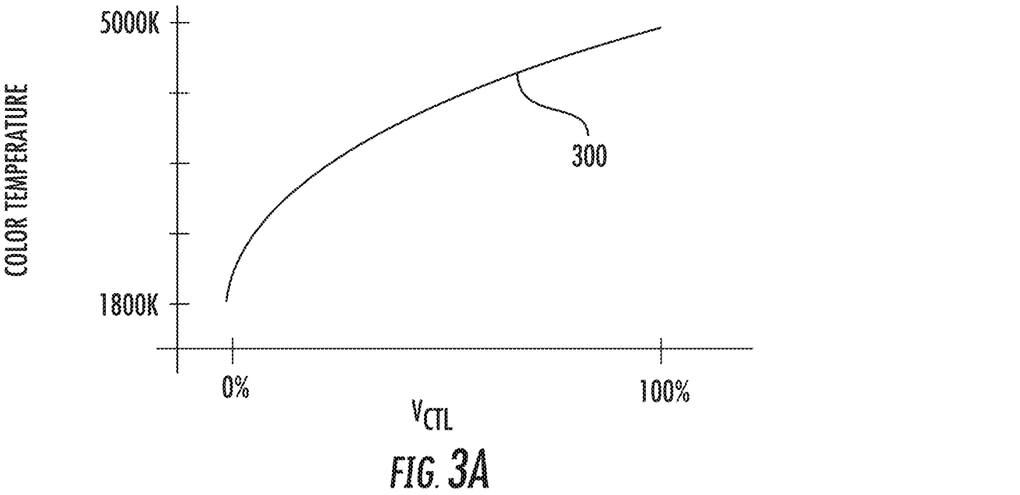
FIGS. 3A and 3B (collectively referred to as FIG. 3) are diagrams depicting an exemplary set of color temperature ranges for various groups of LEDs, based on a level of a control signal.
Figure 3B:
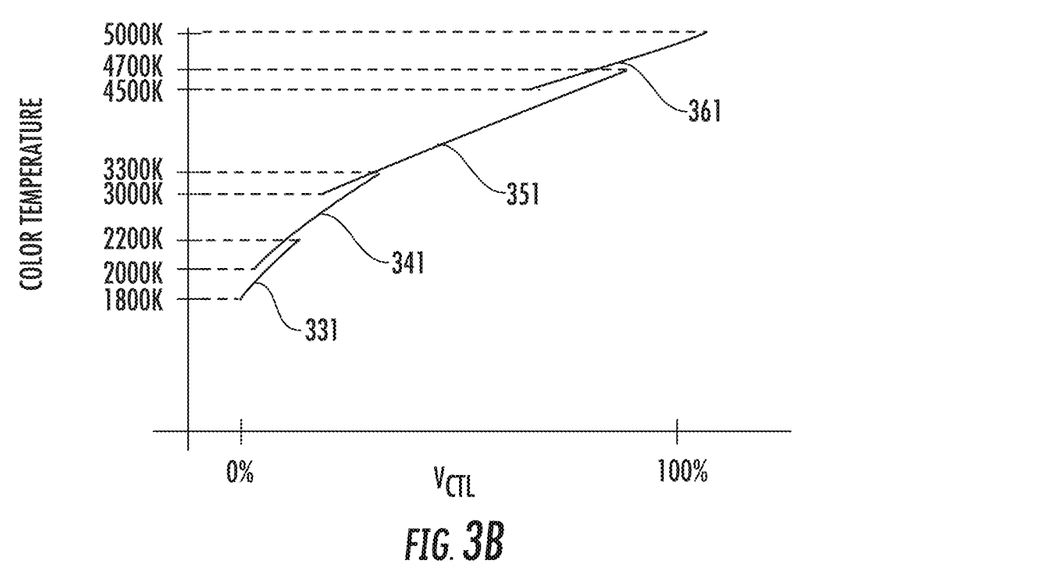

Light produced by the respective LED groups may be blended together to produce light with characteristics based on a combination of the characteristics of the multiple LED groups. For example, the microcontroller 110 may control LED drivers 130 through 160 to power on some or all of LEDs 131 through 161. The combined light may be based on a combination of the light produced by the powered LEDs, as depicted in FIGS. 3A and 3B. The produced light may have a combined color temperature based on a combination of the color temperatures of the multiple LED groups. FIG. 3A depicts an example of a range of color temperatures 300 that may be produced by multiple LED groups. Powered LEDs, such as LEDs included in groups 131 through 161, may produce a combined light having a range of color temperatures 1800 K through 5000 K, based on a control signal level, such as $V_{ctl}$, between 0% and 100%.

FIG. 3B depicts an example of multiple ranges of color temperatures that may be produced by respective ones of the multiple LED groups, based on a respective range of a control signal. For example, a first LED group, such as LED group 131, may have a first range of color temperatures 331 that is relatively warm, such as a range of 1800 K to 2200 K. The first LED group may produce these color temperatures within a first range of the control signal. A second LED group, such as LED group 141, may have a second range of color temperatures 341 that is relatively cooler than the first range, such as a range of 2000 K to 3300 K. The second LED group may produce these color temperatures within a second range of the control signal. A third LED group, such as LED group 151, may have a third range of color temperatures 351 that is relatively cooler than the second range, such as a range of 3000 K to 4700 K. The third LED group may produce these color temperatures within a third range of the control signal. A fourth LED group, such as LED group 161, may have a fourth range of color temperatures 361 that is relatively cooler than the third range, such as a range of 4500 K to 5000 K. The fourth LED group may produce these color temperatures within a fourth range of the control signal. The respective ranges of the control signal may overlap. Different LED groups may have overlapping ranges of color temperatures, such as to provide a smooth transition between groups. Respective ranges of the control signal may also overlap Light having a combined range of color temperatures, such as the range 300 depicted in FIG. 3A, may be produced based on a combination of ranges 331, 341, 351, and 361.

Figure 4A:
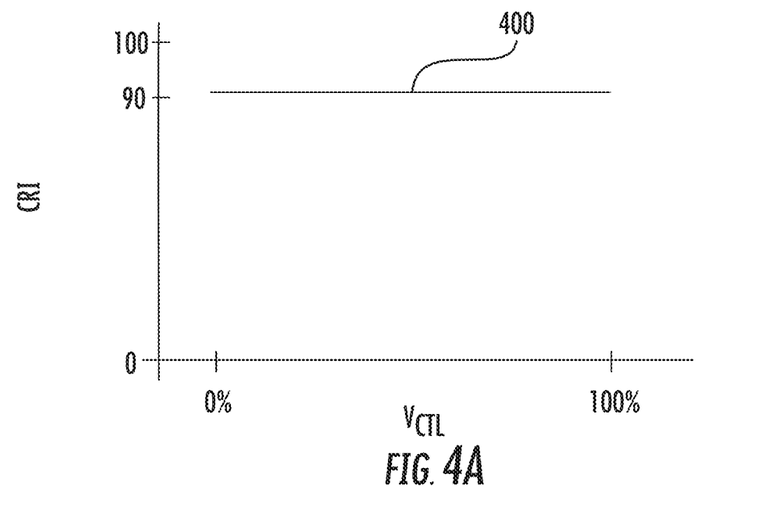
FIGS. 4A and 4B (collectively referred to as FIG. 4) are diagrams depicting an exemplary set of CRI levels for various groups of LEDs, based on a level of a control signal.

In some cases, the produced light may have a combined CRI level based on a combination of the CRI values of the multiple LED groups. FIG. 4A depicts an example of a CRI level 400 that may be produced by multiple LED groups. Powered LEDs, such as LEDs included in groups 131 through 161, may produce a combined light having a CRI level of about 90, based on a control signal level, such as $V_{ctl}$, between 0% and 100%.

Figure 4B:
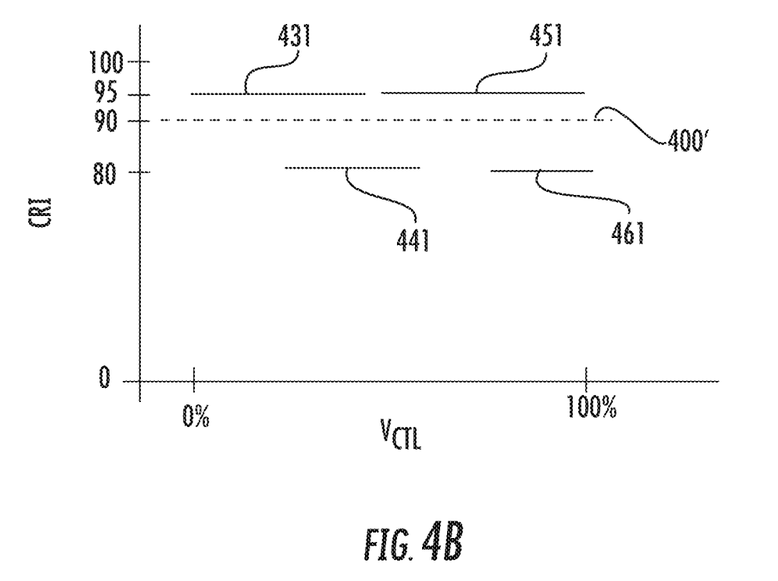

FIG. 4B depicts an example of multiple CRI levels that may be produced by respective ones of the multiple LED groups. A particular LED group may have a CRI value that is above, equal to, or below the target CRI level, and may be capable of producing light with a CRI level above, equal to, or below the target. For example, a first LED group, such as group 131, may have a CRI level 431 that is relatively high, such as a level of about 95. A second LED group, such as group 141, may have a CRI level 441 that is relatively low, such as a level of about 80. A third LED group, such as group 151, may have a CRI level 451 that is relatively high, such as a level of about 95. A fourth LED group, such as a group 161, may have a CRI level 461 that is relatively low, such as a level of about 80. The multiple CRI levels may each have a value relative to a target CRI level, such as target CRI level 400'. For example, CRI levels 431 and 451 may have values above the target level 400', and the CRI levels 441 and 461 may have values below the target level 400'. Light having a combined CRI level, such as CRI level 400 depicted in FIG. 4A, may be produced based on a combination of the levels 431, 441, 451, and 461. In some cases, the target CRI level may be a level between about 70 and about 100.

FIGS. 5A through 5H depict characteristics, such as color temperature and CRI levels, of respective ones of the LED groups. The depicted CRI levels may remain relatively constant based on the control signal level, such as $V_{ctl}$. The depicted CRI levels may have a value relative to a target CRI level, such as target level 400' depicted in FIG. 4B. The depicted color temperatures may be adjustable based on the control signal level. For example, a particular group of LEDs may include multiple individual LEDs, each of which has a particular color temperature. The group of LEDs may be configured such that individual LEDs with relatively warmer color temperatures are powered on at relatively lower levels of the control signal, and individual LEDs with relatively cooler color temperatures are powered on at relatively higher levels of the control signal. The individual LEDs may have color temperatures within a range, such that the LED group produces light over the range of color temperatures based on the level of the control signal. Although the characteristics are depicted as having a linear response to the control signal levels, other implementations are possible. In some cases, the respective LED groups may not be powered on for the entire range of the control signal, or may have a reduced intensity for a portion of the range of the control signal.

Figure 5A:
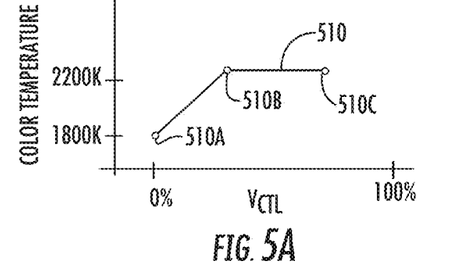
FIGS. 5A through 5H (collectively referred to as FIG. 5) are diagrams depicting exemplary characteristics of respective ones of the LED groups, based on a level of a control signal.
Figure 5B:
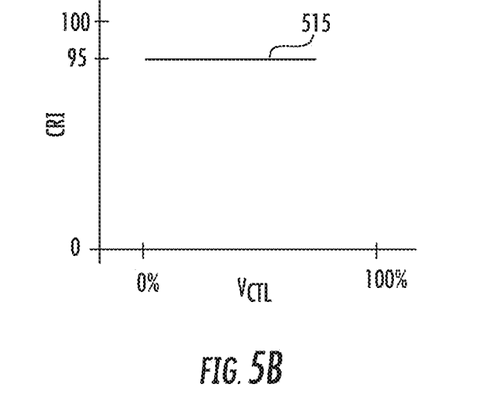

FIGS. 5A and 5B depict characteristics of a first LED group, such as group 131. FIG. 5A depicts the color temperature of the first LED group. For example, the color temperature may increase based on a range 510 of the control signal, such as from about 1800 K at a point 510A to about 2200 K at a point 510B. The color temperature may remain constant for a portion of the range 510, such as at about 2200 K between points 510B and 510C. FIG. 5B depicts a CRI level of the first group that is above a target CRI level. The CRI level of the first group may remain at a relatively constant level over a range 515 of the control signal. For example, the first group may have a CRI level of about 95 that is above a target level of about 90.

Figure 5C:
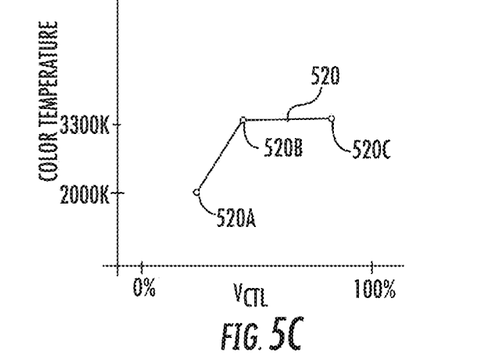
Figure 5D:
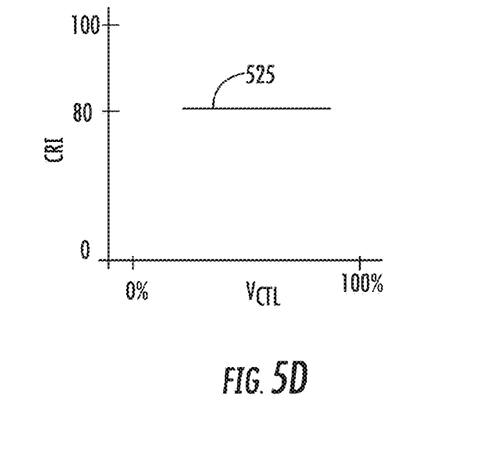

FIGS. 5C and 5D depict characteristics of a second LED group, such as LED group 141. FIG. 5C depicts the color temperature of the second LED group. For example, the color temperature may increase based on a range 520 of the control signal, such as from about 2000 K at a point 520A to about 3300 K at a point 520B. The color temperature may remain constant for a portion of the range 520, such as at about 3300 K between points 520B and 520C. FIG. 5D depicts a CRI level of the second LED group that is below a target CRI level. The CRI level of the second group may remain at a relatively constant level over a range 525 of the control signal. For example, the second LED group may have a CRI level of about 80 that is below a target level of about 90.

Figure 5E:
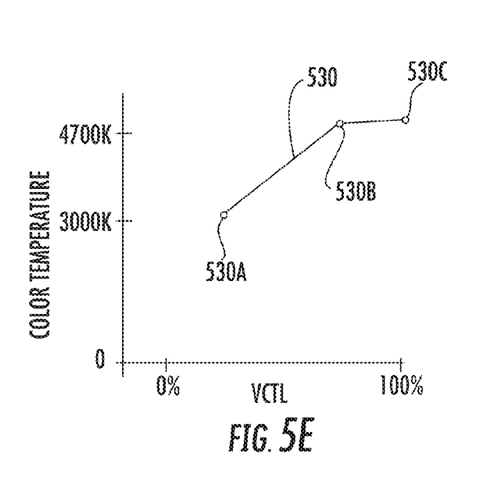
Figure 5F:
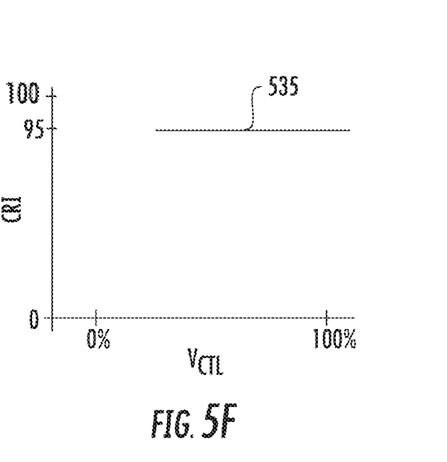

FIGS. 5E and 5F depict characteristics of a third LED group, such as LED group 151. FIG. 5E depicts the color temperature of the third LED group. For example, the color temperature may increase based on a range 530 of the control signal, such as from about 3000 K at a point 530A to about 4700 K at a point 530B. The color temperature may remain constant for a portion of the range 530, such as at about 4700 K between points 530B and 530C. FIG. 5F depicts a CRI level of the third LED group that is above a target CRI level. The CRI level of the second group may remain at a relatively constant level over a range 535 of the control signal. For example, the third LED group may have a CRI level of about 95 that is above a target level of about 90.

Figure 5G:
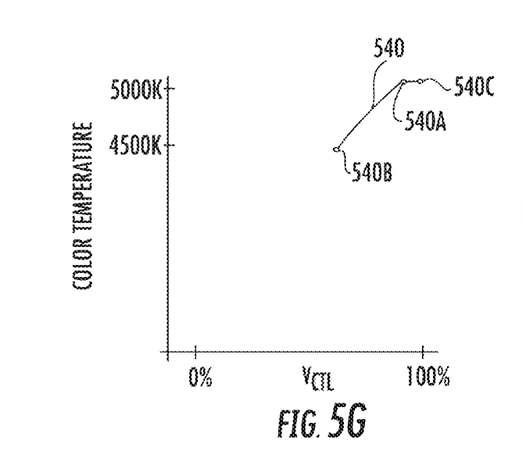
Figure 5H:
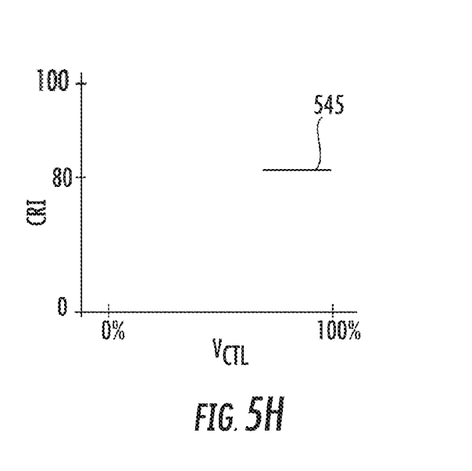

FIGS. 5G and 5H depict characteristics of a fourth LED group, such as LED group 161. FIG. 5G depicts the color temperature of the fourth LED group. For example, the color temperature may increase based on a range 540 of the control signal, such as from about 4500 K at a point 540A to about 5000 K at a point 540B. The color temperature may remain constant for a portion of the range 540, such as at about 5000 K between points 540B and 540C. FIG. 5H depicts a CRI level of the fourth LED group that is below a target CRI level. The CRI level of the second group may remain at a relatively constant level over a range 545 of the control signal. For example, the fourth LED group may have a CRI level of about 80 that is below a target level of about 90.

The LED groups that are described in FIGS. 5A through 5H may produce a combined light that is based on a combination of the characteristics depicted. The characteristics of the combined light may be based on a level of the control signal relative to one or more thresholds of the control signal. In some cases, the characteristics of respective LED groups may have overlapping ranges, such as to allow a smooth transition between groups based on adjustments of the control signal. In some cases, respective LED groups may have a reduced intensity or be powered down based on adjustments of the control signal. For example, at lower levels of the control signal, an LED group with relatively cool color temperatures may have a reduced intensity or be powered down, to achieve a warm dimming effect. At higher levels of the control signal, an LED group with relatively warm color temperatures may have reduced intensity or be powered down, to increase efficiency. The groups of LEDs may be controlled by any suitable technique, including any technique described herein.

In an example implementation, at or below a first control signal threshold, such as a control signal level of about 0%, the LED groups may not be powered on. Above the first control threshold and below a second control threshold, the produced light may be based on the first LED group. For example, above a control signal level of about 0% and below a control signal level of about 25%, the produced light may have a CRI level of about 95, a relatively low intensity (e.g., between about 0% and about 25%), and a relatively warm color temperature (e.g., between about 1800 K and about 2200 K).

Above the second control threshold, such as a control signal level of about 25%, the produced light may be based on the first and second LED groups. For example, above a control signal level of about 25% and below a level of about 50%, the produced light may have a CRI level of approximately the target level (e.g., between CRI levels of about 80 and about 95), a relatively low intensity (e.g., between about 25% and about 50%), and a relatively warm color temperature (e.g., between about 2200 K and about 3300 K).

Above a third control threshold, such as above a control signal level of about 50%, the produced light may be based on the first, second, and third LED groups. For example, above a control signal level of about 50% and below a level of about 75%, the produced light may have a CRI level of approximately the target level, a relatively high intensity (e.g., between about 50% and about 75%), and a relatively cool color temperature (e.g., between about 3300 K and about 4700 K). In some cases, some LED groups may have a reduced intensity or be powered down based on a control signal level above a particular control threshold. For example, the first LED group may be powered down above the second control threshold, to achieve a cool color temperature or to improve efficiency. In these cases, the relatively high CRI level of the third LED group may contribute to the combined CRI level of approximately the target level.

Above a fourth control threshold, such as above a control signal level of about 75%, the produced light may be based on the first, second, third, and fourth LED groups. For example, above a control signal level of about 75% and below a level of about 100%, the produced light may have a CRI level of approximately the target level, a relatively high intensity (e.g., between about 75% and about 100%), and a relatively cool color temperature (e.g., between about 4700 K and about 5000 K).

Figure 6:
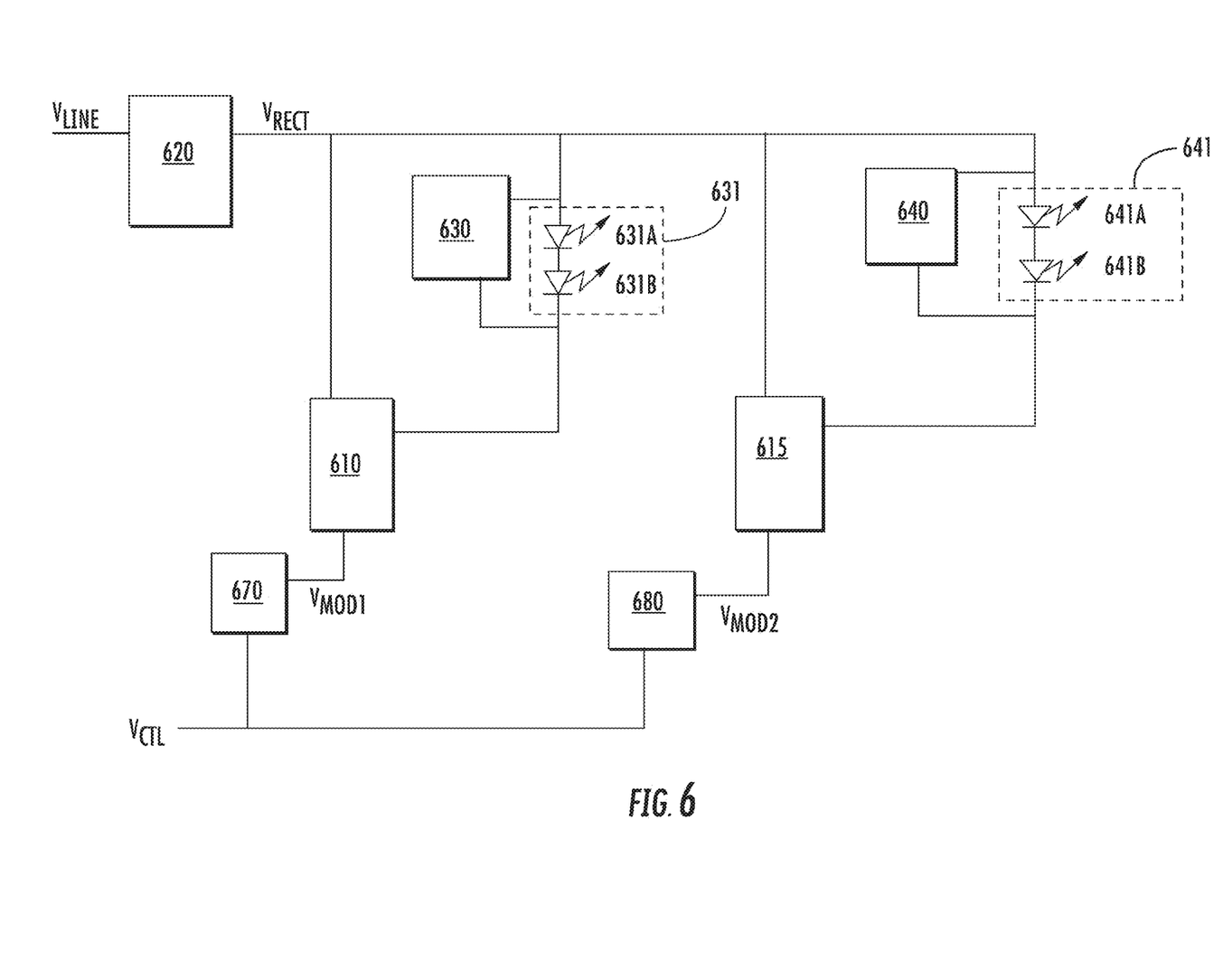
FIG. 6 is a block diagram depicting an example implementation of a circuit capable of modifying a received control signal and producing light based on the modified signals.
Figure 7A:
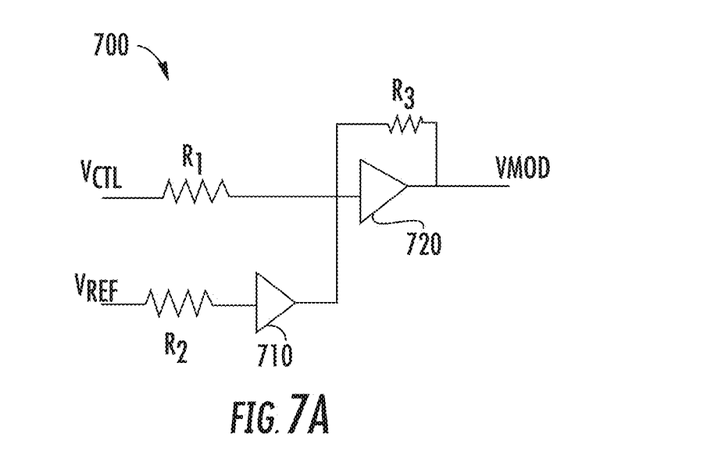
FIGS. 7A and 7B (collectively referred to as FIG. 7) are diagrams depicting examples related to modified signals.
Figure 7B:
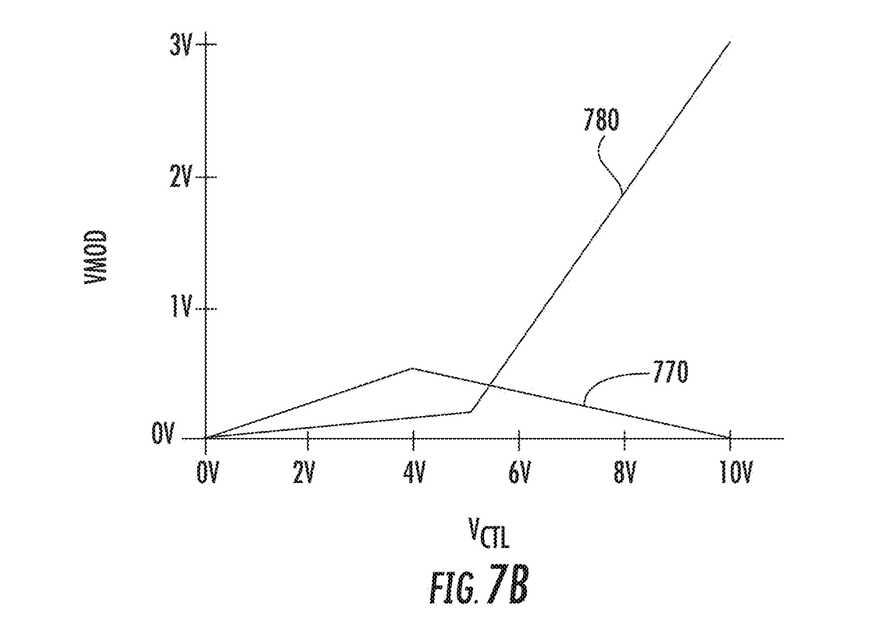

In some cases, a control threshold may be determined based on a modification circuit. FIG. 6 depicts an example implementation of a circuit capable of producing light that includes components capable of modifying a received control signal and providing the modified signal to a microcontroller, such that the produced light is based on the modified control signal. FIG. 7A depicts an example of a modification circuit. FIG. 7B depicts example outputs of various modification circuits. FIGS. 6 and 7 may be understood better if considered together.

In FIG. 6, a rectifier 620 may receive line voltage $V_{line}$, and may rectify the received line voltage to produce rectified voltage $V_{rect}$, such as described in regards to FIG. 1. The rectifier 620 may provide the rectified voltage to one or more microcontrollers, such as microcontrollers 610 and 615. The rectifier 620 may also provide the rectified voltage $V_{rect}$ to one or more groups of LEDs, such as LED groups 631 and 641, or to one or more LED drivers, such as LED drivers 630 and 640. Additional circuit components are envisioned, such as to provide circuit protection or to reduce flicker, but these are not shown in FIG. 6 for clarity.

The microcontroller 610 may be capable of providing a limited current level based on the rectified voltage. For example, the microcontroller 610 may be capable of limiting the current based on the received rectified voltage and a received control signal, and providing the limited current to the LEDs 631. The limited current may comprise a constant current level, such as to prevent flickering or circuit malfunction. The LED driver 630 may power on or off individual LEDs, such as LEDs 631A and 631B within the group 631, based on the level of the current provided by the microcontroller 610. For example, the LED driver 630 may shunt current away from LEDs 631A and 631B when the provided current is below a first level. When the provided current is above the first level and below a second level, the LED driver 630 may shunt current away from LED 631A, while LED 631B receives current. When the provided current is above the second level, the LED driver 630 may not shunt current, and LEDs 631A and 631B may both receive current. Each LED in the group 631 may produce light based on the received current, and the group 631 may produce light based on a combination of the individual LEDs that are powered on (e.g., receiving current).

The microcontroller 610 may receive a control signal, as described in regards to FIG. 1. In some cases, the received control signal is modified by a modification circuit 670. Modification circuit 670 may receive a control signal $V_{ctl}$, such as a 0-10 V signal from a dimming switch. The modification circuit 670 may modify the 0-10 V signal, for example, by reducing it to a 0-3 V signal. The modified control signal may be received by the microcontroller 610. In some cases, the modification circuit 670 may modify the received control signal based on a range of the control signal. For example, within a first range of the control signal (e.g., between about 0 V and about 5 V), the modification circuit 670 may provide a modified signal $V_{mod1}$ having a relatively insensitive response (e.g., a 1 V change in the received signal results in about a 0.5 V change in the modified signal). Within a second range of the control signal (e.g., between about 5 V and about 10 V), the modification circuit 670 may provide a modified signal having a relatively sensitive response (e.g., a 1 V change in the received signal results in about a 2 V change in the modified signal).

FIG. 7A depicts an implementation of example modification circuit 700. Amplifier 710 may receive a reference voltage $V_{ref}$. The reference voltage may be a predetermined a voltage level having a relatively constant level (e.g., about 2 V), and may be received from any suitable circuit component. Amplifier 720 may receive the output of amplifier 710 and a control signal $V_{ctl}$. Additional circuit components, such as R1, R2, and R3, may also be included in the modification circuit 700. The modification circuit 700 may provide the modified control signal $V_{mod}$, based in part on a configuration of the modification circuit, including the values of the additional circuit components. In some cases, the modification circuit may be configured such that a first and second range of the modified control signal $V_{mod}$ are based on a respective first and second range of the control signal $V_{ctl}$.

In some cases, the microcontroller 610 may correlate the modified control signal $V_{mod1}$ with the limited current provided to the LED group 631. For example, in response to receiving a modified control signal within a first range of the modified signal, the microcontroller 610 may provide the limited current below a first level, such that the LED driver 630 may shunt current away from LED 631A while LED 631B receives current, as described above. In response to receiving the modified control signal within a second range of the modified signal, the microcontroller 610 may provide the limited current above the first level and below a second level, such that LEDs 631A and 631B may both receive current, as described above. In some cases, LEDs 631A and 631B may each have a characteristic, such that the group 631 produces light having a blend of the characteristics based on the range of the modified control signal. For example, if LED 631B has a color temperature that is relatively warmer than 631A, the group 631 may produce light that is relatively warmer in response to receiving the modified control signal within the first range.

Additional LEDs, such as LEDs 641A and 641B included in LED group 641, may interact with additional components, such as modification circuit 680, microcontroller 615, and LED driver 640 in a manner comparable to that described for LED group 631, modification circuit 670, and microcontroller 610. In some cases, light that is produced based on a combination of the LED groups may have a blend of characteristics based on the additional LEDs and components. For example, modification circuit 680 may have a second configuration such that a second modified control signal $V_{mod2}$ is based on a third range and a fourth range of the received control signal $V_{ctl}$. The modification circuit 680 may provide the second modified signal $V_{mod2}$ to the microcontroller 615. The microcontroller 615 may correlate the second modified control signal $V_{mod2}$ with limited current provided to LED group 641. Light produced by the LED groups 631 and 641 may be based on respective ranges of the first and second modified control signals. Additional groups of LEDs may receive additional modified signals from additional modification circuits, and light produced by the combination of such groups may be based on the particular ranges of the additional modified signals.

The modification circuits 670 and 680 may produce modified control signals $V_{mod1}$ and $V_{mod2}$, respectively. $V_{mod1}$ and $V_{mod2}$ may each be a 0-3 V signal based on the 0-10 V received control signal $V_{ctl}$. Each modified control signal may be based on a range of the received control signal and on a configuration of the respective modification circuit. For example, modification circuits 670 and 680 may each have a configuration similar to the configuration of example circuit 700. FIG. 7B depicts outputs of various example modification circuits. For example, a first modification circuit, such as modification circuit 670, may have a first output 770. A second modification circuit, such as modification circuit 680, may have a second output 780. The first modification circuit may include a first set of component values for the additional circuit components, such as R1, R2, and R3. Based on the first set of component values, the first output 770 may have an increasing response over a first range of $V_{ctl}$ (e.g., about 0-4 V), and a decreasing response over a second range of $V_{ctl}$ (e.g., about 4-10 V). The second modification circuit may include a second set of values for the additional circuit components. Based on the second set of component values, the second output 780 may have a relatively insensitive increasing response over a third range of $V_{ctl}$ (e.g., about 0-5 V), and a relatively sensitive increasing response over a fourth range of $V_{ctl}$ (e.g., about 5-10 V).

Figure 8:
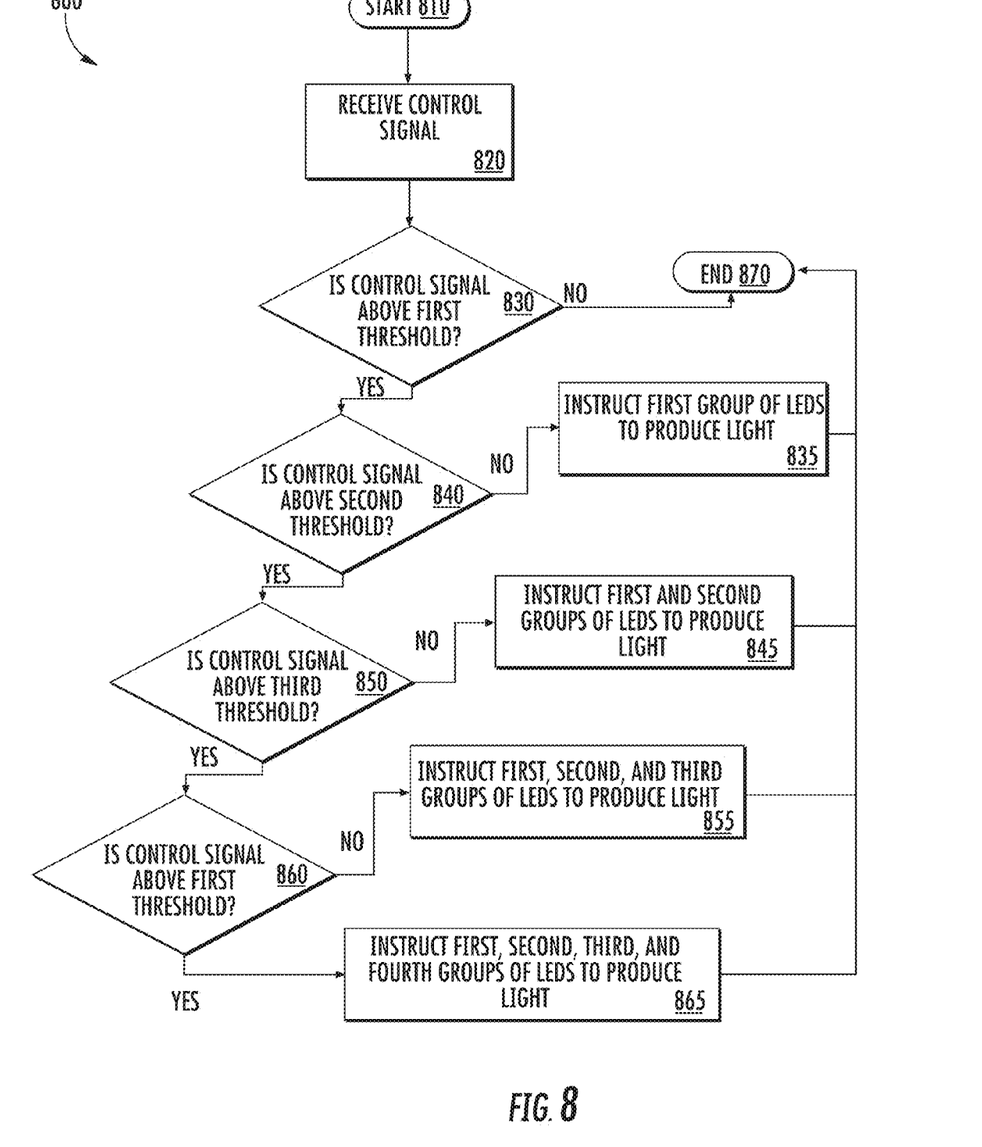
FIG. 8 is a flow chart depicting an example of a process for controlling LEDs to produce light having a relatively high CRI based on a level of a control signal.

FIG. 8 is a flow chart depicting an example of a process 800 for controlling LEDs to produce light based on the level of the control signal. In some configurations, such as described in regards to FIGS. 1-7, a computing device, such as microcontroller 110, implements operations described in FIG. 8 by executing suitable program code. In some cases, the microcontroller may control LED drivers, such as LED drivers 130 through 160, and respective groups of LEDs, such as LED groups 131 through 161, to produce light based on a level of the control signal. In some cases, controlling the LED drivers and LED groups may include providing a current level based on the level of the control signal, as described elsewhere herein. However, any suitable control technique may be used, such as the microcontroller providing logical instructions to the LED drivers. For illustrative purposes, the process 800 is described with reference to the examples depicted in FIGS. 1-7. Other implementations, however, are possible.

The programming of the microcontroller 110 may follow the flow chart depicted in FIG. 8. At starting point 810 of FIG. 8, the light fixture may be in an off state, a standby state, a state of minimal intensity, a previous state, or any other suitable state. At block 820, the microcontroller may receive a control signal, such as signal $V_{ctl}$. At step 830, the microcontroller may determine whether the level of the control signal is above a first threshold. If the control signal is below the first threshold, the process may proceed to ending point 870.

If the control signal is above the first threshold, the microcontroller may determine at step 840 whether the level of the control signal is above a second threshold. If the control signal is below the second threshold, the microcontroller may control a first LED driver and a first LED group to produce light, such as at step 835.

If the control signal is above the second threshold, the microcontroller may determine at step 850 whether the level of the control signal is above a third threshold. If the control signal is below the third threshold the microcontroller may control the first and second LED drivers and first and second LED groups to produce light, such as at step 845.

If the control signal is above the third threshold, the microcontroller may determine at step 860 whether the level of the control signal is above a fourth threshold. If the control signal is below the fourth threshold the microcontroller may control the first, second, and third LED drivers and first, second, and third LED groups to produce light such as at step 855.

If the control signal is above the fourth threshold, the microcontroller may control first, second, third, and fourth LED drivers and first, second, third, and fourth LED groups to produce light, such as at step 865.

After the light is produced, such as in steps 835, 845, 855, or 865, the process 800 may end at step 870. If an adjustment to the control signal is received, the process 800 may return to the starting point 810 to follow the flow chart for the adjusted level. A light fixture implementing the process 800 may continue to produce light based on the determined level of the control signal while the process is at starting point 810 or ending point 870.

The microcontroller may additionally control the LED drivers and LED groups based on the control signal received at step 820. For example, the microcontroller may determine that the received control signal is adjusted between levels that are above the first threshold and below the second threshold. Based on the received adjustments, the microcontroller may control the first LED driver and first LED group to adjust the produced light, such as by adjusting an intensity, a color temperature, or any other suitable quality. Such steps are envisioned but are not depicted in FIG. 8 for clarity. Additional steps relating to default modes, error-checking, or similar logical steps are also envisioned but are not depicted in FIG. 8 for clarity.

The implementations described herein are examples, and the features of different implementations may be combined to achieve many different light output path possibilities, without departing from the described invention. For all of the provided examples and figures, the values, and ranges are exemplary only, and may be changed without departing from the scope of the invention. The depicted and described light produced by the LED groups are exemplary, and different light characteristics may be used without departing from the described invention.

The foregoing descriptions and examples are provided for purposes of illustrating, explaining, and describing aspects of the present invention. Further modifications and adaptations to these examples will be apparent to those skilled in the art and may be made without departing from the scope of the invention. The exemplary systems and methods represented here may be implemented independently, in conjunction with a different one of the systems described, or in conjunction with a system not described herein.

What is claimed is:

1. A system for controlling light-emitting diode (LEDs) to produce light having a target color rendering index (CRI) across a range of color temperatures, the system comprising:
    a power source capable of providing a voltage signal comprising a rectified alternating current (AC) signal;

multiple LEDs capable of receiving the rectified signal from the power source, wherein:
- a first group of LEDs has a first range of color temperatures and a first CRI value above or equal to a target CRI level, wherein the target CRI provides an accurate perception of color, wherein the first CRI value is constant over the first range of color temperatures, and
- a second group of LEDs has a second range of color temperatures and a second CRI value different from the target CRI level, wherein a portion of the second range of color temperatures is cooler than the first range of color temperatures, wherein the second CRI value is constant over the second range of color temperatures; and a microcontroller capable of receiving the rectified signal and a control signal, wherein the microcontroller is configured to (i) produce a current based on the rectified signal, wherein a level of the current is based on a level of the control signal, (ii) provide the current to one or more of the groups of LEDs, and (iii) control the groups of LEDs to produce light based on the received control signal, such that:
- when the level of the control signal is above a first control threshold and below a second control threshold, the microcontroller provides current having a first level to the first group of LEDs, such that the first group of LEDs produces light having a first color temperature within the first range of color temperatures and having a first CRI level above or equal to the target CRI level, and
- when the control signal is above the second control threshold and below a third control threshold, the microcontroller provides current having a second level to the first and second groups of LEDs, such that the first and second groups of LEDs produce light having a second color temperature within the second range of color temperatures and having a second CRI level approximately equal to the target CRI level.

2. The system of claim 1, wherein the microcontroller is further configured to provide current to a subset of LEDs included within a particular group of LEDs, such that the particular group of LEDs produces light based on the subset of the LEDs.

3. The system of claim 1, wherein when the control signal is above the first control threshold the produced light has a first intensity, and when the control signal is above the second control threshold the produced light has a second intensity higher than the first intensity.

4. The system of claim 1, wherein the target CRI level is a CRI level within a range of about 70 to about 100.

5. The system of claim 1, wherein the target CRI level is a CRI level of approximately 90.

6. The system of claim 1, wherein the first range of color temperatures is between 1800 K and 3300 K and the second range of color temperatures is between 3000 K and 5000 K.

7. The system of claim 1, wherein the power source is a rectifier.

8. The system of claim 1, wherein the control signal is received from a dimming switch.

9. The system of claim 1, wherein the control signal is one of a 0-10 volt dimming signal, a forward phase-cut dimming signal, or a reverse phase-cut dimming signal.

10. The system of claim 1, wherein the first CRI value is above the target CRI level, and the second CRI value is below the target CRI level.

11. A method for controlling light-emitting diodes (LEDs) to produce light having a target color rendering index (CRI) across a range of color temperatures, the method comprising:
- receiving, from a power source, a voltage signal comprising a rectified alternating current signal;
- receiving, from a dimming switch, a control signal having an adjustable level;
- producing a current based on the rectified signal, wherein a level of the current is based on a level of the control signal;
- providing the current to multiple groups of LEDs, wherein:
  - a first group of LEDs has a first range of color temperatures and a first CRI value above or equal to a target CRI level, wherein the target CRI provides an accurate perception of color, wherein the first CRI value is constant over the first range of color temperatures, and
  - a second group of LEDs has a second range of color temperatures and a second CRI value different from the target CRI level, wherein a portion of the second range of color temperatures is cooler than the first range of color temperatures, wherein the second CRI value is constant over the second range of color temperatures; and
- controlling the groups of LEDs to produce light based on the received control signal, such that:
  - when the level of the control signal is above a first control threshold and below a second control threshold, the first group of LEDs produces light having a first color temperature within the first range of color temperatures and having a first CRI level above or equal to the target CRI level, and
  - when the control signal is above the second control threshold and below a third control threshold, the first and second groups of LEDs produce light having a second color temperature within the second range of color temperatures and having a second CRI level approximately equal to the target CRI level.

12. The method of claim 11, wherein when the control signal is above the first control threshold the produced light has a first intensity, and when the control signal is above the second control threshold the produced light has a second intensity higher than the first intensity.

13. The method of claim 11, wherein the target CRI level is a CRI level within a range of about 70 to about 100.

14. The method of claim 11, wherein the target CRI level is a CRI level of approximately 90.

15. The method of claim 11, wherein the first range of color temperatures is between 1800 K and 3300 K and the second range of color temperatures is between 3000 K and 5000 K.

16. The method of claim 11, wherein the power source is a rectifier.

17. The method of claim 11, wherein the control signal is one of a 0-10 volt dimming signal, a forward phase-cut dimming signal, or a reverse phase-cut dimming signal.

18. The method of claim 11, wherein the first CRI value is above the target CRI level, and the second CRI value is below the target CRI level.

* * * * *

UNITED STATES PATENT AND TRADEMARK OFFICE
CERTIFICATE OF CORRECTION

PATENT NO. : 9,844,114 B2  
APPLICATION NO. : 15/373580  
DATED : December 12, 2017  
INVENTOR(S) : Towfig Chowdhury et al.

Page 1 of 1

It is certified that error appears in the above-identified patent and that said Letters Patent is hereby corrected as shown below:

On the Title Page

In item (73), in Column 1, in "Assignee", Line 1, delete "ALB" and insert -- ABL --, therefor.

Signed and Sealed this  
Thirteenth Day of November, 2018

Andrei Iancu  
*Director of the United States Patent and Trademark Office*